Patented Sept. 21, 1948

2,449,785

UNITED STATES PATENT OFFICE 2,449,785

COMPOSITION AND PROCESS FOR CURING LUMBER AND PRODUCT

Alfred Lippman, Jr., and Rock L. Comstock, Weeks, and Edward B. Benjamin, New Orleans, La., assignors to Bay Chemical Company, Inc., New Orleans, La., a corporation of Louisiana No Drawing. Application April 1, 1943, Serial No. 481,478

21 Claims. (Cl. 117—147)

This invention relates to a curing composition and method of curing lumber as well as a method of preparing the curing composition, and more particularly to an inexpensive, non-corrosive lumber curing composition, the method of making such composition and the method of employing the composition in the rapid drying of lumber to prevent cracking or checking thereof while at the same time producing a cured lumber which may be employed in conjunction with metal fastening means or otherwise in contact with metal without causing substantial corrosion of the metal and without causing sweating or wetting of the surfaces of the cured lumber by hygroscopic action of the composition residual in the lumber.

In the drying or curing of lumber, during either kiln or atmospheric drying, it is well known that the surface layers of the various boards or timbers tend to check or crack. This cracking or checking is caused by the tendency of the outer layers to dry and shrink while the interior portions of the lumber are still wet and retain substantially their original dimensions. It has been proposed to apply a hygroscopic chemical to the surface of the lumber being dried so as to reduce the differential in moisture content between the interior portions and the surface layers. The most successful of such hygroscopic chemicals have been aqueous solutions of urea and invert sugar. However, the chemicals employed were relatively expensive. It has further been proposed to employ common salt, i. e., sodium chloride, as a lumber curing agent but such material has not heretofore been successful, since at least two deleterious factors are encountered. The sodium chloride in the surface layers of lumber dried with the aid of this material is sufficiently hygroscopic that the lumber tends to sweat excessively in use. This sweating prevents the successful application of and the adhesion of paints or other coating under relatively high humidity conditions and also tends to retain in damp condition structures built of the lumber. Furthermore, sodium chloride alone is extremely corrosive and causes rapid deterioration or destruction of metal in contact therewith, for example fastening devices such as screws or nails and various types of builders' hardware.

The present invention provides a composition of low cost which consists predominantly of common salt, but which contains small amounts of additional material which not only prevent the sweating of the lumber but overcome corrosion difficulties. Lumber treated in accordance with the present invention will not cause corrosion of metals which do not corrode on exposure to the atmosphere and does not increase the corrosion of metals which normally corrode when exposed to the atmosphere. In other words, no corrosion of metal in contact with such lumber occurs when no corrosion would normally occur with untreated lumber. Furthermore, the preferred compositions of the present invention actually decrease corrosion from that which would normally occur with untreated lumber even though these compositions are predominantly sodium chloride. The small additions of other chemicals to the sodium chloride also completely eliminate the problem of sweating so that the lumber can be employed in the same manner as untreated lumber, it being possible to apply adherent coatings of paint thereto even under high humidity conditions, and such coatings remain adherent upon prolonged exposure to high humidity atmospheres or alternate exposures to high humidity atmospheres and low humidity atmospheres.

While the curing composition of the present invention may be applied in aqueous solution, for example by dipping the lumber in vats containing the composition in solution, the present invention also contemplates a novel method of applying the curing agent in granular form and also a method of making the composition so that the small proportions of addition agents are uniformly distributed throughout the composition while still retaining the composition in relatively large crystals so as to prevent too rapid solution of the composition into the aqueous liquid present in the wet lumber and loss of the treating solution by dripping prior to complete drying of the lumber.

The preferred composition of the present invention contains approximately 92% sodium chloride, 4% disodium phosphate, 2% sodium sulfate and 2% borax. As will appear below, alkali metal chlorides containing the phosphate radical added as an alkaline alkali phosphate in conjunction with either the sulfate or borate radical, or both, appear to be the essential ingredients of the composition to provide both absence of sweating and absence of corrosion. In other words, relatively good anti-sweating properties as well as excellent corrosion preventing properties can be secured with mixtures of alkaline alkali phosphates and either alkali metal sulfates or alkali metal borates, but the best results are obtained by admixtures containing all three of these materials. The term "alkaline alkali group phosphates" is intended to cover phosphates whose aqueous solutions have a pH greater than 7 including di- and trisodium phosphate as well as equivalent potassium salts and also ammonium salts such as diammonium phosphate but excluding such salts as monosodium phosphate whose aqueous solutions have a pH less than 7. The latter type of salts is not effective for corrosion prevention.

It has been found that laboratory controls, which give excellent correlation with results obtained by actually subjecting the lumber to weathering, can be set up. Corrosion tests have been carried out by exposing to atmospheric conditions for one month (a) steel nails placed on a layer of the salt composition on a watch glass and then covered completely with more of the salt composition, and (b) steel nails placed on top of a layer of the composition on a watch glass. The test under (a) above represents the conditions of hardware, such as nails or screws, driven within the body of the lumber cured by the salt composition and the test under (b) represents the nail heads or metal hardware attached to the wood and exposed exteriorly thereof. The corrosion was compared to that of nails similarly located but not exposed to the salt composition, which corrosion was considered to be normal corrosion. As stated above, these tests have been compared with corrosion produced by actually employing nails and hardware with lumber cured with similar curing compositions and exposed to the same atmosphere conditions. Excellent correlation has been obtained.

As to the sweating characteristics of lumber cured by the employment of various compositions, it has been found that the retention of moisture by the salt composition is approximately inversely proportioned to the sweating of the lumber, i. e. the collection of moisture from the atmosphere upon the surface of lumber treated by curing compositions. The ability of the composition to retain water is, therefore, a direct measure of the ability of that composition to prevent sweating. Furthermore, the better the retention of moisture by the composition the more effective is its action to prevent checking during drying, hence the better its effect in curing. The moisture retention properties of various compositions were tested by exposing the compositions in a desiccator using the same weight of each composition in an uncovered culture dish. Starting with a dry composition, the atmosphere in the desiccator was maintained at about 90% relative humidity at 65° F. with stirring to make certain of uniformity throughout. After 41 hours the gain in weight in each composition was determined. Each composition was then replaced in the desiccator and the atmosphere changed to almost zero relative humidity by circulating the air over calcium chloride. After 48 hours the loss in weight was determined for each composition. The difference between the moisture originally absorbed at 90% relative humidity and the moisture lost at zero relative humidity represents the moisture retained by the composition. This was reduced to a percentage basis, the moisture retained being expressed as a percentage of the moisture originally absorbed.

The moisture retention thus determined was found to give excellent correlation with actual tests of sweating of the treated lumber under various humidity conditions. The higher the moisture retention developed by a composition in accordance with the above test, the less the tendency for the material to sweat. Furthermore, the higher the moisture retention properties, the more rapidly the drying operation could be carried out upon the lumber without checking or cracking. In general, compositions having a moisture retention percentage above approximately 35 to 40% were found to substantially completely prevent sweating at relative humidities of approximately 75% and those having higher moisture retention percentages prevented sweating at even higher relative humidities.

The following tables illustrate the results obtained from different compositions, including compositions containing sodium chloride alone, and compositions containing the phosphate, sulfate or borate alone, as well as various mixtures of the different materials:

Table I

| Mixture | Sodium Chloride | Disodium Phosphate | Sodium Sulfate | Borax | Moisture Retention, Percent | Corrosion |
|---|---|---|---|---|---|---|
| a | 0 | 0 | 0 | 0 | --- | Normal. |
| b | 95 | 5 | 0 | 0 | 84.5 | Very bad. |
| c | 90 | 6 | 2 | 2 | 87.4 | Much less than normal. |
| d | 92 | 4 | 2 | 2 | 75.5 | Do. |
| e | 94 | 4 | 2 | 0 | 74.4 | Bad. |
| f | 94 | 4 | 6 | 0 | 72.2 | Normal. |
| g | 94 | 4 | 0 | 2 | 73.7 | Much less than normal. |
| h | 94 | 2 | 2 | 2 | 45.5 | Do. |
| i | 90 | 2 | 6 | 2 | 44.3 | Do. |
| j | 92 | 2 | 6 | 0 | 43.7 | Normal. |
| k | 96 | 2 | 0 | 2 | 40.3 | Do. |
| l | 96 | 2 | 2 | 0 | 40.0 | Bad. |
| m | 98 | 2 | 0 | 0 | 33.1 | Very bad. |
| n | 95 | 0 | 5 | 0 | 29.6 | Do. |
| o | 96 | 0 | 2 | 2 | 27.8 | Bad. |
| p | 92 | 0 | 6 | 2 | 27.3 | More than normal. |
| q | 98 | 0 | 2 | 0 | 17.3 | Very bad. |
| r | 98 | 0 | 0 | 2 | 16.4 | Do. |
| s | 95 | 0 | 0 | 5 | 4.9 | Bad. |
| t | 100 | 0 | 0 | 0 | 2.5 | Worst. |

Table II

| Mixture | Sodium Chloride | Trisodium Phosphate | Sodium Sulfate | Borax | Moisture Retention, Percent | Corrosion |
|---|---|---|---|---|---|---|
| u | 92 | 4 | 2 | 2 | 82.5 | Much less than normal. |
| v | 90 | 2 | 6 | 2 | 49.0 | Do. |

Table III

| Mixture | Sodium Chloride | Diammonium Phosphate | Sodium Sulfate | Borax | Moisture Retention, Percent | Corrosion |
|---|---|---|---|---|---|---|
| w | 92 | 4 | 2 | 2 | 64.0 | Less than normal. |

From the above tables it will be noted that all of the compositions which caused no corrosion over that which normally occurs upon exposure of metals to atmospheric conditions, i. e. normal corrosion, contain the phosphate radical in conjunction with either the sulfate radical or the borate radical, or both. The phosphate radical is therefore ineffective by itself to prevent corrosion and the same is true of the sulfate and borate radicals. It will be further apparent that more of the sulfate in conjunction with phosphate without borate is necessary to prevent corrosion than is the case with the borate employed in conjunction with phosphate without sulfate. Thus composition k containing 2% phosphate and 2% borax effectively prevented corrosion, whereas composition l containing 2% phosphate and 2% sulfate was not effective although composition j containing 2% disodium phosphate and 6% sodium sulfate was effective in preventing corrosion. Thus there apparently exists a powerful conjoint action of the phosphate radical and borate radical to prevent corrosion by an alkali metal chloride and a less powerful conjoint action of the phosphate and sulfate radicals. None of the compositions which contained no phosphate radical was effective in preventing corrosion.

As to the moisture retention, it will be noted that all of the best compositions insofar as moisture retention properties are concerned, contain the phosphate radical. In conjoint action with the phosphate, either sulfate or borate without the other are about equivalent as will be evident from the comparison of compositions e and g or compositions k and l. The sulfate is somewhat more effective in the absence of phosphate than borax as will be shown by the comparison of composition g with composition t. It is possible to employ too much borax as a lone ingredient as will be shown by a comparison of composition s with composition r although increased amounts of sulfate alone increase the moisture retention properties as will be shown by comparison of composition g with composition n. The phosphate alone is superior to either borax or sulfate alone as will be shown by comparing compositions b and m with compositions n, g, r and s.

With respect to corrosion resistance, compositions c, d, g, h and i are much superior to any of the other compositions. With respect to retention of moisture, composition c is the best, but is followed rather closely by compositions d and g and compositions h and i are within the effective range. Also compositions f, j and k are within the effective range as to moisture retention and also effectively prevented additional corrosion over normal corrosion. Therefore, compositions c, d, f, g, h, i, j and k are suitable both as to elimination of corrosion and retention of moisture in accordance with the present invention composition d being the preferred composition. Certain of the other compositions are also suitable as far as moisture retention is concerned, but exhibit bad corrosion properties. It will be apparent that the compositions exhibiting both high moisture retention and superior properties as to corrosion prevention contain the phosphate and borax of these two materials in conjunction with the sulfate. It will be further apparent that either sodium sulfate or borax must be added to the phosphate, primarily because of necessary conjoint action to prevent corrosion and secondarily to increase water retention, but the latter can be compensated for readily by somewhat increasing the phosphate content. Furthermore, the borax is advantageous in exerting a conjoint anti-corrosive action with salt and phosphate in the absence of air (covered nails or the like) which is superior to that of sulfate. Thus the borax would be preferable to the sulfate except that sulfate has the property that is not reflected in water retention or corrosion, of keeping dry both the composition and lumber cured therewith, and for this further reason is desirably incorporated in the composition. Therefore, all three are included in the preferred composition.

Tables II and III are included to show that other alkaline alkali phosphates may be employed instead of disodium phosphate. Thus Table II shows the results of employing trisodium phosphate and Table III shows the results of employing diammonium phosphate. It has not been considered necessary to provide data as to a large number of compositions employing these and other alkaline alkali phosphates as the results are generally similar to the results detailed in Table I.

From the above examples, as well as a large number of other determinations, both in the laboratory and in large scale operations involving the curing or seasoning of lumber and tests thereon, it has been found that the proportions of alkaline alkali phosphate may range from between approximately 1 and 8% of the entire composition in conjunction with approximately 3 to 8% of sodium sulfate alone or approximately 1 to 3% of borax alone, while with compositions containing phosphate as well as both sulfate and borax, the phosphate may range between approximately 1 and 8%, the sulfate between approximately 2 to 6% and the borax between approximately 1 to 3%. In each case the remainder of the composition is sodium chloride. Thus, the total amount of addition agent to prevent sweating and corrosion may range from approximately 2 to 17% depending upon whether the sulfate is employed with phosphate in the absence of borax, borax is employed with phosphate in the absence of sulfate, or both sulfate and phosphate are employed in conjunction with borate. The preferred ranges, however, are, phosphate salt 2 to 5%, sulfate salt 2 to 6%, and borate salt 1 to 3%.

While the above discussion has all been largely concerned with the employment of sodium chloride, anhydrous disodium phosphate, and anhydrous sodium sulphate and borax which is $Na_2B_4O_7 10H_2O$, compounds of other alkali metals may be employed instead of sodium compounds, and the presence of the sulfate or borate radical in conjunction with the alkaline alkali phosphate in proper amounts determines the properties of the composition rather than the form of the salt in which they are added. Thus equivalent potassium compounds may be employed instead of sodium compounds and the radicals referred to can be added in other compounds than those mentioned, for example the alkaline alkali phosphate can be added as trisodium phosphate, disodium phosphate, diammonium phosphate or equivalent potassium compounds, etc. In any case, the compositions of the present invention are predominantly alkali metal chloride, with a minor proportion of an alkaline alkali phosphate in conjunction with either an alkali metal sulfate or an alkali metal borate, or both.

The composition of the present invention is preferably prepared in the form of a granular material with the phosphate, sulfate or borate compounds uniformly distributed throughout. In employing the composition it is preferably applied to the lumber in granular form and for this purpose it is found that a material having particles of a size which will substantially all pass a four mesh screen and be retained upon an 8 to 20 mesh screen is preferable. Such material controls the rate of dissolving of the salt in the aqueous liquids contained in the lumber at the start of the drying process. It decreases this rate from that of a powdered material so that the composition has adequate time to penetrate into the wood during formation of the solution instead of the composition withdrawing liquid from the wood to form a surface layer of solution which flows or drips from the wood surfaces carrying the composition with it. The addition compounds may be thoroughly distributed throughout the granular material by first wetting the surfaces of granules of alkali metal chloride having particle sizes in the range above given, with from approximately 2 to 5% by weight of water. This can be accomplished by spraying the water upon the granular salt during rapid agitation of the salt. The alkali metal sulfate, phosphate and borate may then be added to the mass in finely divided form and the powdered materials adhere to and are spaced over the surfaces of the salt crystals, thus providing the uniform distribution above referred to. Preferably, but not necessarily, the addition compounds employed in a given composition are finely divided and intimately admixed prior to adding them to the granular chloride, although the powdered materials may be added separately. Grinding the addition compounds together is an effective way of producing a uniform mixture although separately ground or commercial powdered compounds can be adequately mixed. The mixing of the powdered material with the granular salt having its surface wet with water yields a product which does not tend to stick or cake under ordinary atmospheric conditions and which is very uniform as the powdered ingredients become well distributed over and attached to the surfaces of the salt granules.

The granular product above described is advantageously applied in a dry condition to the lumber to be cured or seasoned. This can be accomplished by spreading the granular material over the upper surface of a layer of boards of wet lumber, positioning another layer of boards thereupon, again spreading a layer of the composition upon the upper surface of the boards, etc. After the salt has been absorbed into the aqueous liquid of the wet lumber so as to penetrate to a large extent into the lumber, the boards are preferably separated by spaces for continued drying. No checking or cracking of the lumber takes place even under rapid drying conditions in drying kilns and the resulting dried lumber is free from sweating characteristics and does not cause corrosion of metal in contact therewith.

As a specific example of drying lumber in accordance with the present invention, approximately 6000 feet of tupelo boards one inch thick were stacked in a lumber drying kiln in an arrangement 100 feet in length and ten layers deep. In stacking the lumber 40 pounds of salt per thousand board feet were spread between the layers. The salt employed was the same as composition i of the above table. The kiln temperature was then kept at 170° F. with a wet bulb temperature of 135° F. for one day. At this time all of the salt had gone into solution in the water from the lumber. The boards were then separated from one another by one inch spacers and the original temperature conditions applied for two more days, after which the wet bulb temperature was decreased to 130° F. for an additional period of five days. At the end of the eighth day of treatment the lumber was adequately dry for use. There was not even one check noticeable and there was no warping. The ordinary schedule for drying identical wood required twelve days without the salt treatment even at the expense of some checking and warping. Subsequent curing operations on the same type of lumber showed that the drying schedule could be increased so that the lumber could be cured in from one-third to one-half the time normally required for drying untreated lumber and that the same was true for lumber in general. The actual time required for curing or seasoning lumber, however, depends upon the type of lumber and no exact time applicable to all types of lumber can be given.

The lumber from the above example was tested both in the laboratory and by exposure to actual weather conditions for sweating and corrosion preventing characteristics. Exposure to the atmosphere was carried out for three weeks under normal weather conditions including days of rainfall and high humidity and no evidence whatever of sweating was detected. Samples of the lumber were also exposed to an atmosphere of 100% relative humidity in a desiccator at 80° F. and no sweating whatever was detected. Plain and galvanized nails were driven through the treated specimens of the lumber and likewise through specimens of the same kind of lumber dried by conventional methods and these test pieces were exposed to the atmosphere in various places. None of the galvanized nails evidenced any sign of corrosion in either class of wood. The plain nails evidenced signs of corrosion upon weathering but there was less corrosion of the nails driven into the treated lumber than was the case of similar nails driven into the regular lumber.

While the composition of the present invention finds its chief utility in rapid drying of lumber in kilns, it can also be advantageously employed for the drying or seasoning of lumber under atmospheric conditions such as in the yard or drying sheds. Application of the composition to wet lumber followed by atmospheric drying prevents checking and warping usually encountered with such drying, particularly under low humidity conditions. The application of the composition reduces the differential drying between the outer layers of the lumber and the inner portions thereof sufficiently to prevent cracking and checking. Also, during the final drying stages, the portion of the composition which has penetrated into the pores of the surface layers of the lumber is deposited as a solid material which compensates for any greater removal of moisture from the surface layers than from the inner portions of the lumber.

While best results are obtained by treating lumber as above described by spreading the curing material in solid form between wet layers of lumber, it is possible to treat the lumber prior to drying by dipping the same into vats or tanks containing a solution of the curing material. This is a less desirable operation as a substantial amount of auxiliary apparatus is required and the concentration of the curing composition upon the surface of the lumber is limited largely by the amount of solution which adheres to the lumber. It will be apparent that the granular form of the curing material is of particular importance with respect to curing processes in which the solid material is employed, but may be employed to make up solutions in dipping vats. In preparing dipping solutions, admixtures of the materials in any form may be employed or the materials may be added separately to water to make up the solution. Even if dipping solutions are employed, the granular material is advantageous because it can be marketed as a product of manufacture containing all of the necessary ingredients for the treating operation and furthermore does not cake or pack during storage or transportation and is easily dissolved to form solutions.

While we have disclosed the preferred embodiments of our invention, it is understood that the details thereof may be varied within the scope of the following claims.

We claim:

1. The method of curing lumber, which comprises, piling the lumber with the surfaces of the individual pieces thereof closely adjacent one another, distributing between said adjacent surfaces during the piling of said lumber a granular soluble water retaining material consisting essentially of a major proportion of alkali metal chloride and minor but substantial proportions of alkaline alkali group phosphate and a material selected from the group consisting of alkali metal sulfate, alkali metal borate and a mixture of alkali metal sulfate and alkali metal borate, subjecting the lumber to temperature and humidity conditions which cause the granular material to be dissolved in the aqueous liquids of the lumber so as to penetrate into the lumber without substantial formation of a surface layer of solution which flows or drips from the lumber, thereafter spacing said surfaces of said lumber and completing the drying of the lumber while said material is present in the surface layers thereof.

2. The method of curing lumber, which comprises, piling said lumber with the surfaces of individual pieces thereof closely adjacent one another, spreading between said adjacent layers during the piling of said lumber a material consisting essentially of granular sodium chloride having approximately 4% sodium phosphate, 2% sodium sulfate and 2% borax in powdered form adhering to the surfaces of said granular sodium chloride, subjecting the lumber to temperature and humidity conditions which cause the granular material to be dissolved in the aqueous liquids of the lumber so as to penetrate into the lumber without substantial formation of a surface layer of solution which flows or drips from the lumber, thereafter spacing said surfaces of said lumber and completing the drying of the lumber while said material is present in the surface layers thereof.

3. The method of curing lumber, which comprises, treating the surfaces of said lumber while wet with a material consisting essentially of alkali metal chloride containing a minor proportion of alkaline alkali group phosphate and a minor proportion of alkali metal borate, and subjecting said lumber to drying conditions of temperature and humidity.

4. The method of curing lumber, which comprises, treating the surfaces of the individual pieces of said lumber with a composition consisting essentially of sodium chloride and containing approximately 4% disodium phosphate, 2% sodium sulfate and 2% borax on the basis of the total composition, and subjecting said lumber to drying conditions of temperature and humidity.

5. As a product of manufacture, lumber having the surface layers thereof impregnated with a composition, which comprises, sodium chloride containing disodium phosphate approximately 4%, sodium sulfate approximately 2%, and borax approximately 2%.

6. The method of curing lumber which comprises subjecting said lumber to drying conditions of temperature and humidity while in contact with a composition comprising a mixture of alkali metal chloride with approximately 1 to 8% of alkaline alkali-group phosphate, approximately 2 to 6% of alkali metal sulfate, and approximately 1 to 3% of alkali metal borate on the basis of the total mixture.

7. As a product of manufacture, lumber having surface layers thereof impregnated with a composition, which comprises, a mixture of alkali metal chloride with approximately 1 to 8% of alkaline alkali metal phosphate, approximately 2 to 6% alkali metal sulfate, and approximately 1 to 3% alkali metal borate on the basis of the total mixture.

8. The method of curing lumber which comprises subjecting said lumber to drying conditions of temperature and humidity while in contact with a composition comprising alkali metal chloride containing minor proportions of alkaline alkali-group phosphate and minor proportions of alkali metal sulfate and alkali metal borate.

9. The method of curing lumber, which comprises, subjecting said lumber to drying conditions of temperature and humidity while in contact with a composition comprising, alkali metal chloride containing a minor proportion of alkaline alkali-group phosphate and a minor proportion of a material selected from the group consisting of alkali metal sulfate, alkali metal borate and a mixture of alkali metal sulfate and alkali metal borate.

10. A composition of matter for preventing cracking and checking of lumber during curing consisting essentially of approximately 1 to 8% of alkaline alkali metal phosphate, approximately 2 to 6% of alkali metal sulfate, approximately 1 to 3% alkali metal borate, and approximately 83 to 96% of alkali metal chloride.

11. A composition of matter for preventing cracking and checking of lumber during curing consisting essentially of approximately 1 to 8% of alkaline alkali metal phosphate, approximately 3 to 8% of alkali metal sulfate, and approximately 84 to 96% of alkali metal chloride.

12. A composition of matter for preventing cracking and checking of lumber during curing consisting essentially of approximately 1 to 8% of alkaline alkali metal phosphate, approximately 1 to 3% of alkali metal borate, and approximately 89 to 98% of alkali metal chloride.

13. A composition of matter for preventing cracking and checking of lumber during curing consisting essentially of approximately 1 to 8% of at least one alkaline sodium phosphate, approximately 2 to 6% of sodium sulfate, approximately 1 to 3% of borax, and approximately 83 to 96% of sodium chloride.

14. A composition of matter for preventing cracking and checking of lumber during curing consisting essentially of approximately 1 to 8% of at least one alkaline sodium phosphate, approximately 3 to 8% of sodium sulfate, and approximately 84 to 96% of sodium chloride.

15. A composition of matter for preventing cracking and checking of lumber during curing consisting essentially of approximately 1 to 8% of at least one alkaline sodium phosphate, approximately 1 to 3% of borax, and approximately 89 to 98% of sodium chloride.

16. A composition of matter for preventing cracking and checking of lumber during curing consisting essentially of approximately 4% of disodium phosphate, approximately 2% of sodium sulfate, approximately 2% of borax, and approximately 92% of sodium chloride.

17. As a product of manufacture, lumber having surface layers thereof impregnated with a composition consisting essentially of approximately 1 to 8% of alkaline alkali metal phosphate, approximately 3 to 8% of alkali metal sulfate and approximately 84 to 96% of alkali metal chloride.

18. As a product of manufacture, lumber having surface layers thereof impregnated with a composition consisting essentially of approximately 1 to 8% of alkaline alkali metal phosphate, approximately 1 to 3% of alkali metal borate and approximately 89 to 98% of alkali metal chloride.

19. As a product of manufacture, lumber having surface layers thereof impregnated with a composition consisting essentially of approximately 1 to 8% of at least one alkaline sodium phosphate, approximately 2 to 6% of sodium sulfate, approximately 1 to 3% of borax, and approximately 83 to 96% of sodium chloride.

20. As a product of manufacture, lumber having surface layers thereof impregnated with a composition consisting essentially of approximately 1 to 8% of at least one alkaline sodium phosphate, approximately 3 to 8% of sodium sulfate and approximately 84 to 96% of sodium chloride.

21. As a product of manufacture, lumber having surface layers thereof impregnated with a composition consisting essentially of approximately 1 to 8% of at least one alkaline sodium phosphate, approximately 1 to 3% of borax, and approximately 89 to 98% of sodium chloride.

ALFRED LIPPMAN, Jr.
ROCK L. COMSTOCK.
EDWARD B. BENJAMIN.

REFERENCES CITED

The following references are of record in the file of this patent:

UNITED STATES PATENTS

| Number | Name | Date |
|---|---|---|
| 287,351 | Walter, Jr. | Oct. 23, 1883 |
| 644,670 | Green | Mar. 6, 1900 |
| 675,500 | Ste. Marie et al. | June 4, 1901 |
| 1,248,711 | Teesdale | Dec. 4, 1917 |
| 1,282,249 | Lewis | Oct. 22, 1918 |
| 1,576,209 | Neubauer | Mar. 9, 1926 |
| 1,781,730 | Morris | Nov. 18, 1930 |
| 2,175,955 | Craig et al. | Oct. 10, 1939 |
| 2,347,635 | Smith | Apr. 25, 1944 |

FOREIGN PATENTS

| Number | Country | Date |
|---|---|---|
| 405,673 | Great Britain | 1934 |

OTHER REFERENCES

Heating-Piping and Air Conditioning, May 1931, article by R. C. Doremus, pages 372–377.